United States Patent
Sawaki et al.

(10) Patent No.: US 8,007,691 B2
(45) Date of Patent: Aug. 30, 2011

(54) FINE PARTICLE OF PEROVSKITE OXIDE, PARTICLE HAVING DEPOSITED PEROVSKITE OXIDE, CATALYST MATERIAL, CATALYST MATERIAL FOR OXYGEN REDUCTION, CATALYST MATERIAL FOR FUEL CELL, AND ELECTRODE FOR FUEL CELL

(75) Inventors: Yuko Sawaki, Ibaraki (JP); Mikio Kishimoto, Ibaraki (JP); Haruyuki Nakanishi, Toyota (JP); Shigeaki Murata, Toyota (JP); Masahiro Imanishi, Toyota (JP); Shinichi Matsumoto, Toyota (JP)

(73) Assignees: Hitachi Maxell Energy, Ltd., Kyoto (JP); Toyota Jidosha Kabushiki Kaisha, Toyota-shi, Aichi (JP)

(*) Notice: Subject to any disclaimer, the term of this patent is extended or adjusted under 35 U.S.C. 154(b) by 225 days.

(21) Appl. No.: 12/304,452

(22) PCT Filed: Jun. 12, 2007

(86) PCT No.: PCT/JP2007/061825
§ 371 (c)(1),
(2), (4) Date: Dec. 11, 2008

(87) PCT Pub. No.: WO2007/145216
PCT Pub. Date: Dec. 21, 2007

(65) Prior Publication Data
US 2009/0200519 A1 Aug. 13, 2009

(30) Foreign Application Priority Data

Jun. 13, 2006 (JP) .................. 2006-164095
Jun. 20, 2006 (JP) .................. 2006-170114

(51) Int. Cl.
*H01B 1/08* (2006.01)

(52) U.S. Cl. ........... 252/514; 252/520.1; 252/520.3
(58) Field of Classification Search .......... 252/520.1, 252/520.2, 514, 520.3; 428/403; 429/523, 429/528
See application file for complete search history.

(56) References Cited

U.S. PATENT DOCUMENTS 5,380,692 A 1/1995 Nakatsuji et al.
(Continued)

FOREIGN PATENT DOCUMENTS

JP 62-254361 A 11/1987
(Continued)

OTHER PUBLICATIONS

Kong et al "Gas-sensing property and mechanism of CaxLa1-xFeO3 ceramics", Sensors and Actuators B 30 (1996) 217-221.*
(Continued)

*Primary Examiner* — Mark Kopec
(74) *Attorney, Agent, or Firm* — Birch, Stewart, Kolasch & Birch, LLP

(57) ABSTRACT

A catalyst for electrodes in solid-polymer fuel cells which comprises metal oxide particles themselves. The catalyst contains fine transition-metal oxide particles having, in the main phase, a perovskite structure represented by the general formula $ABO_3$ (wherein A represents one or more elements selected among lanthanum, strontium, cerium, calcium, yttrium, erbium, praseodymium, neodymium, samarium, europium, silicon, magnesium, barium, niobium, lead, bismuth, and antimony; and B represents one or more elements selected among iron, cobalt, manganese, copper, titanium, chromium, nickel, and molybdenum), the fine oxide particles having lattice constants satisfying the following relationship (1):

$$1.402 < 2b/(a+c) < 1.422 \qquad (1)$$

wherein a and c represent the minor-axis lengths of the perovskite type crystal lattice and b represents the major-axis length thereof.

12 Claims, 3 Drawing Sheets

U.S. PATENT DOCUMENTS

| | | |
|---|---|---|
| 6,372,686 B1 * | 4/2002 | Golden ............... 502/302 |
| 6,569,803 B2 | 5/2003 | Takeuchi |
| 6,631,057 B1 * | 10/2003 | Allenspach et al. ..... 360/324.11 |
| 6,689,505 B1 | 2/2004 | Albers et al. |
| 7,205,257 B2 | 4/2007 | Tanaka et al. |
| 7,244,688 B2 | 7/2007 | Reetz et al. |
| 2001/0016554 A1 | 8/2001 | Takeuchi |
| 2004/0072061 A1 | 4/2004 | Nakano et al. |
| 2004/0137310 A1 * | 7/2004 | Kiros ................... 429/42 |
| 2005/0148464 A1 | 7/2005 | Reetz et al. |
| 2005/0255993 A1 | 11/2005 | Tanaka et al. |
| 2006/0134506 A1 | 6/2006 | Kim et al. |
| 2006/0260955 A1 | 11/2006 | Sasaki et al. |
| 2008/0044692 A1 | 2/2008 | Reetz et al. |

FOREIGN PATENT DOCUMENTS

| | | | |
|---|---|---|---|
| JP | 5-217586 A | | 8/1993 |
| JP | 5-261289 A | | 10/1993 |
| JP | 8-117598 A | | 5/1996 |
| JP | 11-28357 A | | 2/1999 |
| JP | 2000-36303 A | | 2/2000 |
| JP | 2000-307171 A | | 11/2000 |
| JP | 2001-269578 A | | 10/2001 |
| JP | 2002-352806 A | | 12/2002 |
| JP | 2002346387 | * | 12/2002 |
| JP | 2003-288905 A | | 10/2003 |
| JP | 2004-41866 A | | 2/2004 |
| JP | 2004-197130 A | | 7/2004 |
| JP | 2004-209468 A | | 7/2004 |
| JP | 2004-321986 A | | 11/2004 |
| JP | 2004-363056 A | | 12/2004 |
| JP | 2005-50759 A | | 2/2005 |
| JP | 2005-50760 A | | 2/2005 |
| JP | 2005-526596 A | | 9/2005 |
| JP | 2005-270873 A | | 10/2005 |
| JP | 2006-62953 A | | 3/2006 |
| WO | WO 02/075827 A1 | | 9/2002 |

OTHER PUBLICATIONS

Zhang et al "Cu- and Pd- substituted nanoscale Fe-based perovskites . . . ", Journal of Catalysis 237 (2006) 368-380.*

JP 2000-307171 English translation.*

Paranjape et al "Electronic transport in nanostructured thin films of perovskite manganite La0.67Ca0.33MnO3 . . . ", J. Phys. D.: Appl. Phys. 38 (2005) 3674-3681.*

Bera et al., "Ionic dispersion of Pt and Pd on Ce02 by combustion method: effect of metal-ceria interaction on catalytic activities for NO reduction and CO and hydrocarbon oxidation," Journal of Catalysts, vol. 196, 2000, pp. 293-301.

Office Action in U.S. Appl. No. 11/992,545 mailed Jun. 23, 2010.

Roy et al., "High rates of NO and N20 reduction by CO, CO and hydrocarbon oxidation by 02 over nano crystalline Ce0.98Pd0.020w-8: catalytic and kinetic studies," Applied Catalysis B: Environmental, vol. 71, 2007, pp. 23-31.

Xu et al., "Electrochemical oxidation of ethanol on Pt-Ce02/C catalysts," Journal of Power Sources, vol. 142, 2005, pp. 27-29.

* cited by examiner

[Figure 1]
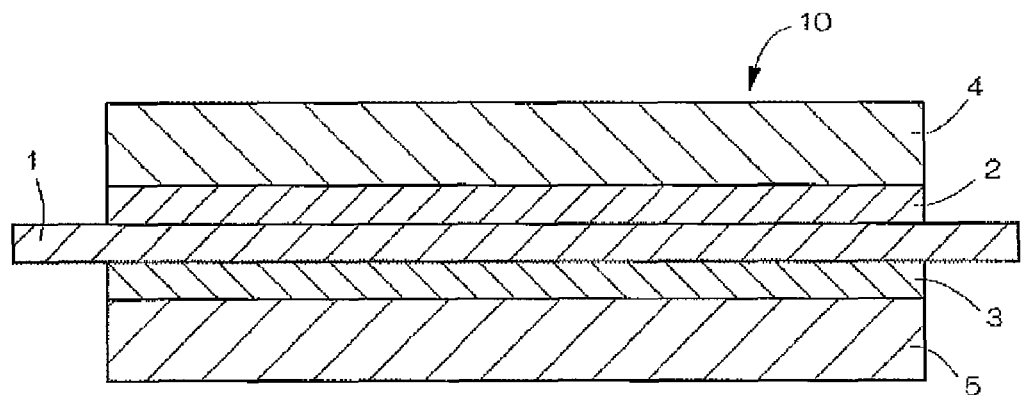
[Figure 2]
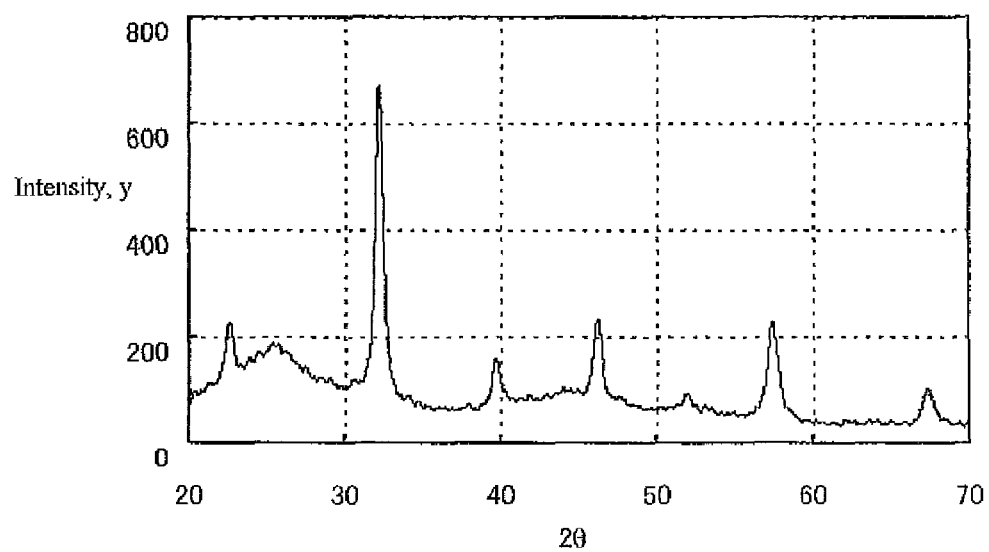

[Figure 3]
Example 1: Cyclic voltammogram
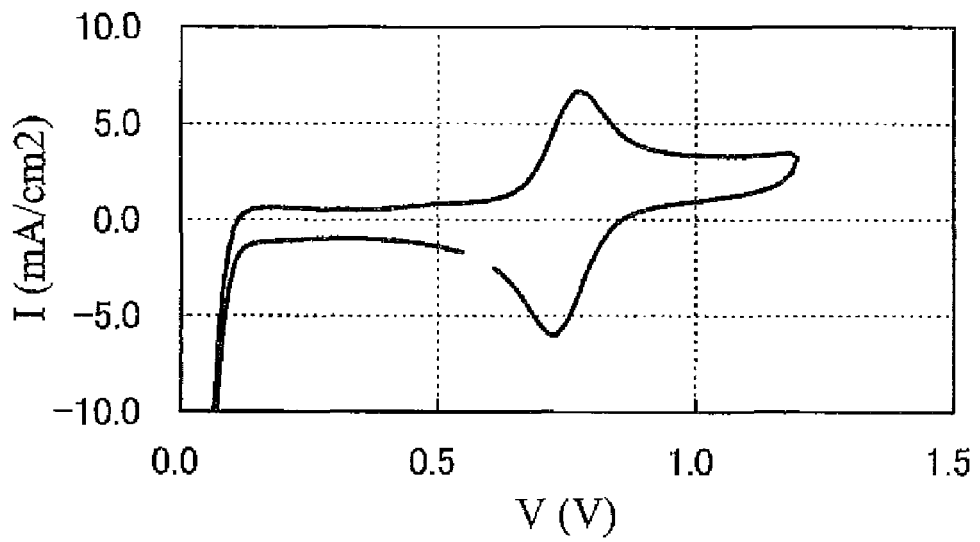
[Figure 4]
Comparative example 1: Cyclic voltammogram
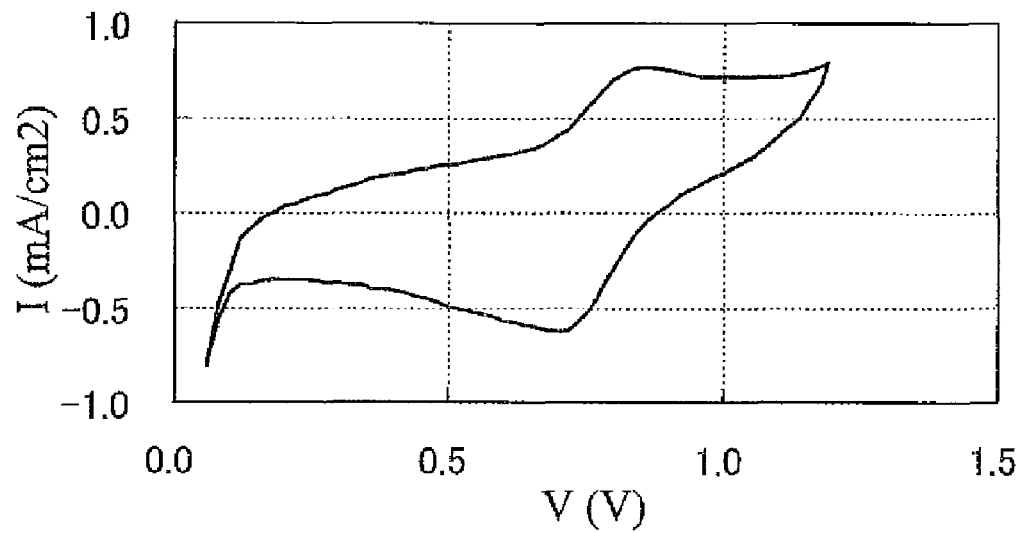

[Figure 5]
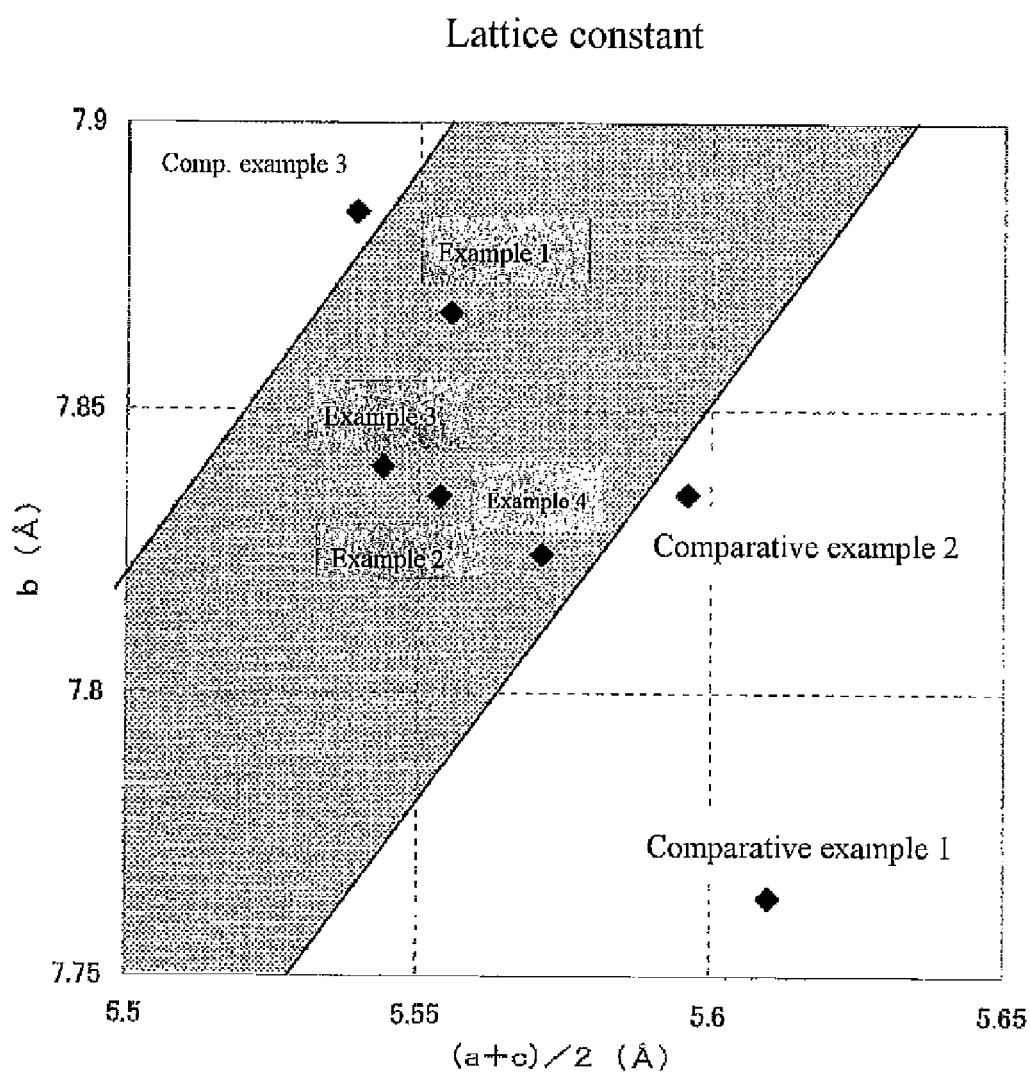

FINE PARTICLE OF PEROVSKITE OXIDE, PARTICLE HAVING DEPOSITED PEROVSKITE OXIDE, CATALYST MATERIAL, CATALYST MATERIAL FOR OXYGEN REDUCTION, CATALYST MATERIAL FOR FUEL CELL, AND ELECTRODE FOR FUEL CELL

TECHNICAL FIELD

The present patent application claims priority under the Paris Convention based on Japanese Patent Applications No. 2006-164095 (filed on Jun. 13, 2006) and No. 2006-170114 (filed on Jun. 20, 2006), and the entire content of the aforementioned applications is hereby incorporated by reference.

The invention relates to fine perovskite type oxide particles having specific crystal lattice constants, and more specifically, relates to fine perovskite type oxide particles comprising transition metal elements as constituent elements, containing a crystal structure of a perovskite type transition metal oxide as the main phase and having crystal lattice constants in a specific range, and also to perovskite type oxide-supporting particles comprising an electrically conductive carrier that supports said oxide particles thereon and an electrode for fuel cells produced therefrom.

BACKGROUND ART

Conventionally, metal particles, alloy particles, metal oxide particles, etc., supported on carrier particles have been used as catalysts for various uses including deodorants, antibacterial agents, automobile exhaust gas purifiers, fuel cells, and Nox reducers. Materials used for such carrier particles include carbon and metal oxides such as titanium oxide, zirconium oxide, iron oxide, nickel oxide, and cobalt oxide. In particular, catalysts comprising electrically conductive carbon particles as carrier can serve effectively as catalyst for fuel cell electrodes.

Among others, materials comprising a carbon carrier that supports platinum-ruthenium alloy particles and those comprising a carbon carrier that supports fine metallic platinum particles along with specific metal oxide particles, such as molybdenum oxide and cerium dioxide, as promoter have been known to serve effectively as catalyst for electrodes. Patent document 1, for instance, describes that agglomeration of platinum particles can be reduced by depositing particles of a corrosion resistant oxide, such as cerium dioxide and zirconium oxide, on platinum particles followed by depositing the platinum particles on a carbon carrier. Patent documents 2 and 3 propose an electrode catalyst that is produced by depositing particles of noble metal, such as platinum, on the surface of perovskite type titanium oxide particles and applying a paste of said noble metal-supporting oxide over a carbon membrane and describe that the perovskite type titanium oxide works as promoter to improve the catalytic ability.

On the other hand, some perovskite type composite metal oxides that are transition metal oxides with specific structures are known to be able to decompose NOx, and Patent document 4 proposes NOx contact catalysts comprising a carrier supporting such oxides. Patent document 5 describes that catalysts produced by depositing a noble metal, such as Pt, Pd and Rh, on such a perovskite type Fe oxide carrier show high catalytic ability at very high temperatures above 500° C. Patent document 6 describes, furthermore, that a catalyst that works effectively not only at high temperatures but also at low temperatures and has improved resistance to sulfur poisoning can be produced by replacing part of the Fe sites in the perovskite type Fe oxide (represented by the general formula $AFeO_3$) with noble metal atoms such as Pt, Pd, and Rh.

Some perovskite type composite metal oxides comprising transition metal elements such as iron, cobalt, and nickel have already been put to practical use as catalyst for air electrodes in solid oxide fuel cells (SOFC). Solid oxide fuel cells are used in a high temperature environment at about 800° C. or more, but it has been known that at such high temperatures, the transition metal elements contained can work by themselves as oxygen-degradable catalyst.

Patent document 7 described, furthermore, that sintering of the platinum particles on the carrier can be prevented and the usage of costly platinum particles can be decreased if alumina, silica, manganese oxide, iron oxide, cobalt oxide, or other metal oxide particles coexist with the supported platinum particles on the carbon particles.

Common processes available to deposit various metal oxides on the surface of a carrier include the following:
(1) To allow a carrier to adsorb metal colloid particles,
(2) To disperse carrier particles in an aqueous metal salt solution, and use an alkaline chemical agent to allow metal hydroxide to precipitate on the carrier surface
(3) To use fine particles to prepare a fine particle dispersion liquid, and then allow the fine particles to be fixed on the surface of a carrier.

Known methods that use such liquid phase processes are proposed in Patent documents 8 and 9. In Patent document 8, platinum-supporting carbon particles are dispersed in a mixed solution of appropriate metal salts, and the hydroxides of said metals are precipitated on the carbon particles using an alkaline chemical agent, followed by heating the solution in a reducing environment at 1000° C. or above to allow the carbon particles to support fine alloy particles (fine particles of four metal alloy of platinum, molybdenum, nickel, and iron). The document specifies that the fine alloy particles should have a size of about 3 nm or more.

In the process to produce carbon particles supporting vanadium pentoxide proposed in Patent document 9, an organic solvent is added to the organic vanadium solution for solvation to produce organic complexes, which are then adsorbed on the carbon particles. In this case, the vanadium pentoxide supported on the carbon particles is in an amorphous state.

To deposit a perovskite type oxide on a carrier surface, the carrier may be coated with an aqueous solution containing its metal salt, dried and heat-treated at a high temperature to cause its precipitation on the carrier surface. For instance, a process to produce a carrier supporting perovskite type iron fine oxide particles is proposed in Patent document 10, which consists of synthesizing perovskite type iron oxide particles having Pd contained in their crystal lattice, using them to produce slurry, coating the carrier with the slurry, and heat-treating it. For this process, the perovskite type iron oxide particles synthesized first had a submicronic size, and the carrier had a sufficient surface area for coating with the slurry.

Besides, Patent document 11 describes a method using microwave plasma treatment to deposit metal oxide particles on carbon-based material. In the processes given as example, titanium oxide, nickel oxide, and cobalt oxide are deposited on carbon, and the document describes that the method can be applied to perovskite type composite metal oxides. With this method, it is possible to allow a carbon-based carrier to support a metal oxide that cannot be deposited easily on a carbon material because it requires a high oxidation temperature where the carbon material starts to burn, although this method requires special equipment to carry out the plasma treatment.

[Patent document 1] Japanese Unexamined Patent Publication (Kokai) No. 2004-363056
[Patent document 2] Japanese Unexamined Patent Publication (Kokai) No. 2005-50759
[Patent document 3] Japanese Unexamined Patent Publication (Kokai) No. 2005-50760
[Patent document 4] Japanese Unexamined Patent Publication (Kokai) No. Hei 5-261289
[Patent document 5] Japanese Unexamined Patent Publication (Kokai) No. 2001-269578
[Patent document 6] Japanese Unexamined Patent Publication (Kokai) No. 2004-321986
[Patent document 7] Japanese Unexamined Patent Publication (Kokai) No. 2005-270873
[Patent document 8] Japanese Unexamined Patent Publication (Kokai) No. Hei 5-217586
[Patent document 9] Japanese Unexamined Patent Publication (Kokai) No. 2000-36303
[Patent document 10] Japanese Unexamined Patent Publication (Kokai) No. 2004-41866
[Patent document 11] Japanese Unexamined Patent Publication (Kokai) No. Hei 11-28357

DISCLOSURE OF INVENTION

As described above, transition metal oxides themselves are generally known to serve as material for various catalysts or promoters for improving corrosion resistance. Perovskite type oxides, in particular have been used as catalyst for solid oxide fuel cells, and furthermore, those perovskite type oxides in which part of the constituent elements are replaced with a noble metal, such as palladium in particular, have been used as catalyst for exhaust gas purifiers, and can be regarded as known material.

Although promoters comprising a carrier that supports a noble metal element along with a common metal oxide that can be represented as MxOy, MOOH, Mx(OH)y (M denoting a transition metal element) have been used for solid polymer fuel cells (PEFC), however, no processes have been reported that use a transition metal oxide alone as electrode catalyst.

For perovskite type oxides, in particular, no processes have been known either that use an electrically conductive, low-price and widely available particle material, such as carbon black and other carbon particles, as carrier, along with perovskite type oxide particles supported on it. Materials developed so far are intended to serve as catalyst for solid oxide fuel cells (SOFC) or exhaust gas purifiers, using perovskite type oxide particles themselves as carrier or, even if it is not the case, using an alumina- or cerium-based heat resistant oxide as carrier to support them. This may be because a carrier used in a catalyst for exhaust gas purifiers for automobile engines etc. does not need to be electrically conductive as carbon black, and also because carbon black cannot serve as carrier in a catalyst for solid oxide fuel cells or for exhaust gas purifiers which have to operate in a high temperature service environment of nearly 1000° C.

In addition, even the idea of using metal oxide particles themselves as electrode catalyst for solid polymer fuel cells (PEFC) has not been found in literature so far. This is because solid polymer fuel cells use polymer material as electrolyte and need to operate at a low temperature at 300° C. or below at the utmost, and a perovskite type oxide effective for solid oxide fuel cells, for instance, may fail to show catalytic ability, making researches believe that materials other than the noble metal particles would not work as catalyst at such a low temperature. For such a reason, platinum particles are mainly used as catalyst in present-day solid polymer fuel cell electrodes, and the reduction in the usage of platinum in catalysts for cathodes is now an urgent problem to be solved.

In view of these circumstances, the invention mainly aims to provide an electrode catalyst for solid polymer fuel cells wherein metal oxide particles are used directly in order to decrease the usage of platinum.

The inventors have discovered that some transition metal oxides, which normally do not have the ability to reduce oxygen molecules when used as solid polymer fuel cell electrode catalyst in a service environment at a low temperature of 300° C. or below at the utmost, can under specific conditions reduce and dissociate oxygen molecules even at room temperature through the redox activity of the transition metal elements contained. The mechanism of this phenomenon has not been clarified, but the redox activity of the transition metal elements results from movements of oxygen atoms in the perovskite lattice, and these movements of oxygen atoms are likely to have effect on the reduction and dissociation of the oxygen molecules adsorbed on the surface.

They have also discovered in their study for this invention that the lattice constants of the perovskite type oxides are an essential part of the conditions for facilitating the reduction and dissociation of the oxygen molecules. The phenomenon and correlation have not been known at all in the past and have been an epoch-making discovery.

Here, the effective lattice constant range for the reduction and dissociation of the oxygen molecules is very narrow and limited, and the inventors have carried out earnest studies for production of perovskite type oxides that have such lattice constants. The lattice constants of an oxide change as they are influenced complicatedly by the ionic radii and existence ratios of the constituent elements, and number of lattice defects, as well as their particle diameters when they are nanometer-size fine particles, and detailed fine adjustment is required.

Detailed studies for the invention have shown that for perovskite type oxides comprising iron as primary element, it is effective because of its ionic radius to mainly use lanthanum as the "A site" element and add platinum to the iron site, which leads to a perovskite type oxide having lattice constants in a specific range.

Thus, the invention relates to fine perovskite type oxide particles that contain transition metal elements and have crystal lattice constants in a specific range, which are allowed to have optimum crystal lattice constants for reduction and dissociation of oxygen molecules so that the transition metal oxide particles themselves can show oxygen reduction activity at room temperature. The development of such fine perovskite type oxide particles will provide the key to the reduction in platinum usage.

Major and preferred embodiments of the invention are described below.

<1> Fine transition metal oxide particles comprising, as main phase, a perovskite type structure as represented by the general formula $ABO_3$,
(where "A" denotes one or more elements selected from the group of lanthanum, strontium, cerium, calcium, yttrium, erbium, praseodymium, neodymium, samarium, europium, silicon, magnesium, barium, niobium, lead, bismuth, and antimony, "B" denotes one or more elements selected from the group of iron, cobalt, manganese, copper, titanium, chrome, nickel, and molybdenum) wherein the lattice constants of said fine oxide particles meet the following conditional equation (1):

$$1.402 < 2b/(a+c) < 1.422 \qquad (1)$$

(where, "a" and "c" denote the minor-axis lengths of the perovskite type crystal while "b" denotes its major-axis length).

<2> Fine perovskite type oxide particles as described in paragraph <1> comprising mainly iron as the element denoted by "B" (B-element).

<3> Fine perovskite type oxide particles as described in paragraph <1> wherein the average particle diameter is 1 to 20 nm.

<4> Fine perovskite type oxide particles as described in paragraph <1> wherein said fine oxide particles contain a noble metal.

<5> Fine perovskite type oxide particles as described in paragraph <4> wherein said noble metal is in the form of noble metal atoms substituted for part of the atoms constituting the oxide crystal lattice, or in the form of noble metal crystals combined with oxide crystals to form composite structures, or in the form of noble metal particles adhered to the oxide surface.

<6> Fine perovskite type oxide particles as described in paragraph <4> wherein the element ratio of said noble metal to the total quantity of said B-element is in the range of 1 to 20%.

<7> Perovskite type oxide-supporting particles comprising fine perovskite type oxide particles as described in any of paragraphs <1> to <6> supported on an electrically conductive carrier.

<8> Perovskite type oxide-supporting particles as described in paragraph <7> wherein said electrically conductive carrier is electrically conductive carbon particles.

<9> Perovskite type oxide-supporting particles as described in paragraph <7> wherein the ratio by weight of the supported fine perovskite type oxide particles in the perovskite type oxide-supporting particles ([weight of fine perovskite type oxide particles]/[total weight of oxide-supporting particles]) is in the range of 5 to 50 wt %.

<10> A catalyst material comprising, as primary component, fine perovskite type oxide particles as described in any of paragraphs <1> to <6>.

<11> A catalyst material for oxygen reduction comprising, as primary component, fine perovskite type oxide particles as described in any of paragraphs <1> to <6>.

<12> A catalyst material for fuel cells that makes use of the oxygen reduction action of the catalyst material for oxygen reduction as described in paragraph <11>.

<13> An electrode for fuel cells comprising a catalyst material for fuel cells as described in paragraph <12>.

Effect of the Invention

The invention provides fine perovskite type oxide particles that are of a perovskite type oxide comprising a transition metal element, wherein oxygen reduction activity develops due to movements of oxygen elements through the crystal lattice when the crystal lattice constants are in a specific range. The resulting fine particles are useful as material for cathode electrodes for fuel cells. When supported on an electric conductivity carrier such as carbon, these fine perovskite type oxide particles can serve very effectively as catalysts for electrode for fuel cells.

BRIEF DESCRIPTION OF DRAWINGS

FIG. 1 schematically shows a cross section of a structure of a membrane electrode assembly (MEA) for fuel cells. It is a schematic view of a typical membrane electrode assembly.

FIG. 2 shows a powder X-ray diffraction spectrum of carbon particles (perovskite type oxide-supporting particles) supporting 10 nm $La(Fe_{0.95}Pt_{0.05})O_3$ particles produced in Example 1.

FIG. 3 shows a CV curve measured in Example 5 using particles produced in Example 1.

FIG. 4 shows a CV curve measured in Example 5 using particles produced in Comparative example 1.

FIG. 5 shows curves for lattice constants of particles produced in different Examples and Comparative examples.

BEST MODE FOR CARRYING OUT THE INVENTION

Any appropriate process may be used to produce the perovskite type oxide particles of the invention, and generally known processes may be applied. For the invention, in cases where a solution of complex ions of metals is prepared first followed by depositing them on an electric conductivity carrier, carrier particles are dispersed in said solution to allow said complex ions of metals to be adsorbed on the surface of said carrier particles, dried to allow the fine oxide particle precursors to be precipitated on the carrier surface, and heat-treated to provide perovskite type oxide-supporting particles.

The invention is based on the discovery that in cases where the lattice constants of perovskite type oxide crystals meet the formula (1) given below and transition metal elements that can exist stably in the perovskite type crystal lattice are contained in the B-sites of the perovskite type oxide (general formula: $ABO_3$), the transition metal elements in the crystal lattice can be redox-active and have oxygen reduction activity at room temperature, and perovskite type oxide-supporting particles produced by depositing them on an electrically conductive carrier such as carbon will works as functional material suitable for cathode electrodes catalysts for fuel cells:

$$1.402 < 2b/(a+c) < 1.422 \tag{1}$$

where, "a" and "c" denote the minor-axis lengths of the perovskite type crystal while "b" denotes its major-axis length.

In the invention, the catalyst electrode for fuel cells make use of the incoming and outgoing movements of the oxygen atoms in the crystal lattice caused by the redox activity of the transition metal elements, and therefore, the invention is expected to provide the key to developing a catalyst function with less or no usage of noble metal elements such as platinum.

The fine perovskite type oxide particles of the invention is described more in detail below. The transition metals used as the main elements to be contained at the B-site in the perovskite type structure of $ABO_3$ are one or more transition metal elements selected from the group of copper (Cu), manganese (Mn), iron (Fe), titanium (Ti), molybdenum (Mo), and cobalt (Co), but it is preferable that at least one of iron, copper, and manganese is contained as an element to be easily magnetized in the crystal lattice. Iron is used as the main element for the B-site in the exampled described later, but in general, may perovskite type oxides ban be magnetized by adding other elements, and it is expected that there are many options to replace iron. In any case, it is more preferable that elements that can be ferromagnetic in the crystal lattice should be used as main elements. This is because those perovskite type oxides that can become ferromagnetic tend to show high electric conductivity and the mobility of their ions in the crystal lattice is higher in many cases. A high ion mobility means easy movements of oxygen atoms in the crystal lattice, and the incoming and outgoing movements of oxygen atoms at the crystal surface will be facilitated.

There are no specific limitations on the A-site metal elements in the perovskite type structure of $ABO_3$ if they can exist stably. For instance, they may be one or more transition metal elements selected from the aforementioned transition metal elements other than the B-site ones, or may be one or more elements selected from the group of other metal elements including lanthanum (La), strontium (Sr), cerium (Ce), calcium (Ca), yttrium (Y), erbium (Er), praseodymium (Pr), neodymium (Nd), samarium (Sm), europium (Eu), silicon (Si), magnesium (Mg), barium (Ba), chrome (Cr), nickel (Ni), niobium (Nb), lead (Pb), bismuth (Bi), and antimony (Sb). Lanthanum is used in most cases in the invention because iron is adopted as the main element, but appropriate elements should be selected depending on the ones selected for the B-site.

Next, appropriate additive elements should be selected to control the lattice constants in an optimum range. The platinum element is used in this invention because platinum is the best element for the lanthanum-iron perovskite type oxide from the viewpoint of the ionic radius, but elements other than platinum may also be used as a matter of fact if they can work to change the lattice constants and maintain a ferromagnetic substance composition. Any such elements can be used if they can exist stably in the crystal lattice.

The fine perovskite type oxide particles of the invention have electric conductivity, and therefore, they themselves can serve as catalyst for electrodes, but they may be deposited on a electrically conductive carrier such as carbon to improve the characteristics. For instance, useful carbon particle products such as Denka Black® supplied by Denki Kagaku Kogyo Kabushiki Kaisha, Vulcan® supplied by Cabot Corporation, other acetylene or ketjen black products and furnace carbon products, and the perovskite type oxide particles are deposited on these carbon particles carriers. Any appropriate methods may be used for the deposition operation, and a common fine particle deposition method may serve sufficiently.

Here, the final product of perovskite type oxide-supporting particles should preferably be have an average particle diameter in the range of 20 to 70 nm. The final product of perovskite type oxide-supporting particles is expected to have a sufficient catalytic ability if its average particle diameter is 20 nm or less, but it is not preferable because heavy agglomeration will take place due to the small particle diameter during the synthesis step, making uniform dispersion difficult. The final product will not completely lose its catalytic ability if its average particle diameter is 70 nm or more, it is not preferable because the catalytic ability decreases with the specific surface area.

The average particle diameter of the carbon particles is determined from the average over 100 particles observed in photographs taken with a transmission electron microscope (TEM). Here, the quantity of the metal elements contained in the solution is adjusted so that the perovskite type oxide will account for 5 to 50 wt % of the final product of the perovskite type oxide-supporting particles. Serious problems will not take place even if the quantity of the supported perovskite type oxide in the perovskite type oxide-supporting particles less than 5 wt %, but when used as catalyst for instance, the effective catalyst volume will decrease, making it difficult to function effectively. Serious problems will not take place either even if the content is 50 wt % or more, but it is not preferable because as the content increases, fine particles will be more likely to overlap each other or agglomerate instead of being in the form of a monolayer adhered to the surface of the carbon particles.

When used as material for the electrodes for fuel cells, these fine perovskite type oxide particles may be used singly or in the form of a combination of perovskite type oxide particles and noble metal particles.

The basic particle constitutions are as described above, but optimum compositions etc. of the perovskite type oxide should be selected for each case. There are no specific limitations on the combination of the elements to constitute the perovskite type oxide o if they can exist stably, but their composition should be in a range required to achieve the optimum lattice constants. The lattice constants, however, do not depend only on the composition, but vary widely depending on the particle size, synthesis conditions, etc. Accordingly, the optimum conditions for the combination, composition, particle size, synthesis conditions, etc., of the elements contained will vary among different particular cases, and should be adjusted for each of them.

Thus, all these conditions described above should be adjusted properly to produce perovskite type oxide particles that comprise transition metal elements, have crystal lattice constants in the range defined by the following conditional equation (1) and have a crystallite size in the range of 1 to 20 nm, and also to produce perovskite type oxide-supporting particles with an average particle diameter of 20 to 70 nm that consist of an electrically conductive carrier and said oxide particles supported thereon:

$$1.402 < 2b/(a+c) < 1.422 \qquad (1)$$

where the lattice constants "a" and "c" denote the minor-axis lengths while "b" denotes the major-axis length.

An electrode for fuel cells serves effectively if the aforementioned lattice constants meet the conditional equation (1), and its ability will deteriorate gradually as the values of the constants deviate from the optimum range. Of the lattice constants, "a" and "c" for the a- and c-axes must be equal to each other if the crystal structure is completely symmetric. A crystal such as $LaFeO_3$, for instance, that does not contain any additive elements has a considerably high symmetry, and "a" and "c" will have near values though not equal. For the product of the invention to have good characteristics, the lattice constants should be in the range defined by the aforementioned equation and the difference between the a- and c-axis lengths should be larger (larger distortion to cause lower symmetry).

The mechanism for this has not been clarified, but the fact that not only the lattice constants but also distortion seem to be involved suggest that large influence must be exerted by the distance between oxygen atoms rather than the distance between the atoms contained at the A- and B-sites in the perovskite type oxide crystal lattice. This is considered to be because such a change in the distance between oxygen atoms will prevent the reduction and dissociation of oxygen. In general, the mobility of the oxygen ions in the crystal lattice is expected to increase if the perovskite type oxides are electrically conductive. Accordingly, the oxygen molecules adsorbed on the surface will be more likely to suffer reduction and dissociation if the oxides in the composition are electrically conductive. In the invention, however, efficient reduction and dissociation of oxygen molecules take place only when the lattice constants are in a specific range, and therefore, it is considered that not only the electrical conductivity of the oxides in the composition but also the distance between the oxygen atoms in the perovskite type oxide crystals that appear in the surface have major influence.

The average particle diameter of the particles is determined from the average over 100 particles observed in TEM photographs. For this observation, the fine perovskite type oxide particles are likely to have sufficient catalyst characteristics even if their crystallite size is 1 nm or less. However, the lattice interval of perovskite type oxides is normally 0.5 nm (5 Å) in most cases, and because of the crystal structure, the number of lattice points is too small to achieve stable bonds. As a result, it will become difficult to maintain the oxide structure, and in addition, its production itself will become difficult for these reasons. Even if the crystallite size 20 nm or more, catalyst characteristics will not be lost completely as long as oxygen atoms in the crystal lattice appear in the surface, but a sufficient specific surface area will not be obtained, leading to a reduction in the catalyst ability.

For the aforementioned reasons, the fine perovskite type oxide particles should preferably have a crystallite size of 1 to 20 nm. In such fine particles of 20 nm or less, it is rare for a single particle to have a polycrystalline structure, and almost all particles have a single crystal structure. Therefore, besides the use of TEM photographs, the average particle diameter of the supported fine particles can also be calculated from the average crystallite size determined from powder X-ray diffraction spectra. In the case of fine particles with a particle diameter of several nanometers or less, in particular, the determination of the particle diameter from visual observation in TEM photographs etc. involves too large measurement errors, and therefore, it should preferably be determined from the average crystallite size. If there exist coarse particles having a polycrystalline structure, however, the measurements may be of the size of the crystallites contained in those coarse particles, and therefore, it should be confirmed that the particle diameter determined from the average crystallite size is consistent with the size of the particles observed with TEM.

For the fine particles obtained, powder X-ray diffraction spectra are observed, and crystal lattice constants are calculated from the peak positions determined. A spectral measurement range of 20 to 80 degrees may suffice if the measurements obtained can serve to determine the lattice constants.

If the transition metal elements have high redox activity, that is, if the oxygen ions in the crystal lattice have a large mobility, a redox peak attributable to iron will appear in the range of about 0.6 to 0.8V in the cyclic voltammetry (CV) curve of the powder. In this observation, the activity peak appearing in the CV curve will be sharper and the difference between the activity energies for the oxidation and reduction will be smaller as the activity increases. As the activity decreases, on the other hand, the activity peak in the CV curve will be broader and the difference between the activity energies for the oxidation and reduction will be larger or even the activity peak will disappear. This feature serves for confirmation.

Next, a membrane electrode assembly (MEA) for fuel cells produced from the fine perovskite type oxide particles of the invention is described below to show an example of electrode for fuel cells comprising the fine perovskite type oxide particles used as electrode catalyst material.

FIG. 1 schematically shows a cross-sectional structure of the membrane electrode assembly (MEA) for fuel cells. The membrane electrode assembly 10 comprises a solid polymer electrolyte membrane 1, an air electrode 2 provided on one side in the thickness direction of the assembly, a fuel electrode 3 provided on the other side, a gas diffusion layer 4 for the air electrode provided on the outer side of the air electrode 2, and a gas diffusion layer 5 for the fuel electrode provided on the outer side of the fuel electrode 3. Of these, the solid polymer electrolyte membrane 1 may be a polyperfluorosulfonic acid resin membrane such as Nafion™ supplied by Du Pont, Flemion™ supplied by Asahi glass Co., Ltd., and Aciplex™ supplied by Asahi Chemical Industry Co., Ltd. The gas diffusion layers 4 and 5 may be a piece of porous carbon cloth or a carbon sheet. A common process as described below may be used to produce the membrane electrode assembly 10.

Catalyst-supporting carbon particles, polymers, and required agents such as binder are added to a solvent mainly comprising a lower alcohol such as ethanol and propanol, and dispersed by using a common dispersion apparatus such as magnetic stirrer, ball mill, and ultrasonic dispersion apparatus to produce a catalyst paint. For this process, the quantity of the solvent is adjusted so as to produce a paint with an optimum viscosity for the coating method used. Then, the catalyst paint obtained is used to produce the air electrode 2 or the fuel electrode 3, followed in most cases by one of the three steps (1) to (3) described below. Any of the evaluation means may be used for the fine particle-supporting carbon particles of the invention, but the same production process should be used when comparative evaluations are to be made.

(1) The catalyst paint obtained is applied uniformly with an appropriate tool such as bar coater over a releasable base plate such as polytetrafluoroethylene (PTFE) film, polyethylene terephthalate (PET) film, polyimide film, PTFE-coated polyimide film, PTFE-coated silicon sheet, and PTFE-coated glass cloth, and dried to produce an electrode membrane over the releasable base plate. This electrode membrane is peeled off, and cut into pieces with a predetermined electrode size. Two such electrode membranes are produced, and used as either the air electrode or the fuel electrode. Then, each of these electrode membranes is adhered to either side of the solid polymer electrolyte membrane with a hot press or hot roll press, and a gas diffusion layer is provided on the air electrode and on the fuel electrode, followed by integrating them with a hot press to produce a membrane electrode assembly.

(2) The catalyst paint obtained is applied on the gas diffusion layer for the air electrode and on the gas diffusion layer for the fuel electrode, and dried to produce an air electrode and a fuel electrode. Spray coating and screen printing may be used for the coating in this step. Then, these gas diffusion layers coated with an electrode membrane are used to sandwich the solid polymer electrolyte membrane, followed by integrating them with a hot press to produce a membrane electrode assembly.

(3) The catalyst paint obtained is applied on both sides of the solid polymer electrolyte membrane with an appropriate method such as spray coating, and dried to produce a air electrode and a fuel electrode. Then, a gas diffusion layer is provided on either side of the air electrode and the fuel electrode, followed by integrating them with a hot press to produce a membrane electrode assembly.

For the membrane electrode assembly 10 thus obtained as shown in FIG. 1, a current collector (not shown in FIG. 1) is then provided on the air electrode 2 side and the fuel electrode 3 side to achieve electric connection, and hydrogen and air (oxygen) are supplied to the fuel electrode 3 and the air electrode 2, respectively, to serve as a fuel cell.

Example 1

$La(Fe_{0.95}Pt_{0.05})O_3/C$, 40 wt % Supported Particles

A 2.23 g portion of lanthanum nitrate hexahydrate, 1.98 g of iron nitrate nonahydrate, and 0.14 g of Hydrogen hexachloroplatinate hexahydrate were dissolved in a solution comprising 80 ml of water and 20 ml of ethanol, and 2.16 g of citric acid was added to prepare an aqueous solution containing citrate complex ions of lanthanum, iron and platinum.

Then, 2 g of Vulcan XC-72 (registered trademark, carbon black product supplied by Cabot Corporation, average particle diameter 30 nm, the same applying hereinafter), used as carbon particles, was impregnate with about 2 ml of said aqueous solution containing citrate complex ions to allow said complex compound to be adsorbed on the surface of Vulcan. The carbon particles were heat-treated in nitrogen at 600° C., and rinsed to provide carbon particles supporting fine perovskite type composite oxide particles $La(Fe_{0.95}Pt_{0.05})O_3$.

The $La(Fe_{0.95}Pt_{0.05})O_3$-supporting carbon particles thus obtained were observed by powder X-ray diffraction. As shown in FIG. 5, a distinct single phase peak of the perovskite type structure was seen while no peaks relating to platinum particles were found. As shown FIG. 2, a discrete single phase peak attributable to a perovskite type structure appeared and the lattice constants were determined from the peak position to be 5.5672×7.867×5.5437 (Å), indicating the relation 2b/(a+c)=1.416. No peak attributable to a platinum-based structure appeared in the powder X-ray diffraction spectrum although platinum actually existed, suggesting that the platinum atoms were contained in the lattice of a perovskite structure. Here, the average crystallite size determined from the half-width of the diffraction peak was 10.3 nm. In addition, observations with a transmission electron microscope (TEM) indicated that fine composite metal oxide particles of about 10 nm were scattered on the surface of the carbon particles. The analysis of the composition and supported particles was carried out by x-ray fluorescence spectroscopy and X-ray photoelectron spectroscopy (XPS).

Example 2

$La(Fe_{0.95}Pt_{0.05})O_3/C$, 40 wt % Supported Particles

The same procedure for producing fine particle-supporting carbon particles as in Example 1 except that lanthanum nitrate hexahydrate, iron nitrate nonahydrate and Hydrogen hexachloroplatinate hexahydrate were dissolved in 100 ml of water was carried out to prepare an aqueous solution containing citrate complex ions of iron and platinum. A total 100 ml of the aqueous solution containing citrate complex ions was used to impregnate carbon particles to allow said complex compound to be adsorbed on the surface of Vulcan. Then, the particles were heated in a nitrogen atmosphere at 90° C. for about 2 hours, and heat-treated in a nitrogen atmosphere at 600° C. to provide carbon particles supporting fine perovskite type composite oxide $La(Fe_{0.95}Pt_{0.05})O_3$ particles.

The $La(Fe_{0.95}Pt_{0.5})O_3$-supporting carbon particles thus obtained were observed by powder X-ray diffraction. A distinct single peak of the perovskite type structure was seen, as in Example 1, and its lattice constants were 5.5645×7.8348×5.5536 (Å), indicating the relation 2b/(a+c)=1.410. Here, the average crystallite size determined from the half-width of the diffraction peak was 14.7 nm. In addition, TEM observations indicated that fine composite metal oxide particles of about 15 nm were scattered on the surface of the carbon particles.

Example 3

$La(Fe_{0.98}Pt_{0.02})O_3/C$, 40 wt % Supported Particles

The same procedure for producing fine particle-supporting carbon particles as in Example 1 except that 2.04 g, instead of 1.98 g, of iron nitrate nonahydrate and 0.06 g, instead of 0.14 g, of Hydrogen hexachloroplatinate hexahydrate were used was carried out to prepare an aqueous solution containing citrate complex ions of iron and platinum. A total 100 ml of the aqueous solution containing citrate complex ions was used for impregnation to allow said complex compound to be adsorbed on the surface of Vulcan. Then, the particles were heat-treated in a nitrogen atmosphere at 600° C. to provide carbon particles supporting fine perovskite type composite oxide $La(Fe_{0.98}Pt_{0.02})O_3$ particles.

The $La(Fe_{0.98}Pt_{0.02})O_3$-supporting carbon particles thus obtained were observed by powder X-ray diffraction. A distinct single peak of the perovskite type structure was seen, as in Example 1, and its lattice constants were 5.5407×7.8400×5.5468 (Å), indicating the relation 2b/(a+c)=1.414. Here, the average crystallite size determined from the half-width of the diffraction peak was 12.6 nm. In addition, TEM observations indicated that fine composite metal oxide particles of about 10 to 15 nm were scattered on the surface of the carbon particles.

Example 4

$La(Fe_{0.97}Pt_{0.3})O_3/C$, 40 wt % Supported Particles

The same procedure for producing fine particle-supporting carbon particles as in Example 1 except that 2.02 g, instead of 1.98 g, of iron nitrate nonahydrate and 0.08 g, instead of 0.14 g, of Hydrogen hexachloroplatinate hexahydrate were used was carried out to prepare an aqueous solution containing citrate complex ions of iron and platinum. A total 100 ml of the aqueous solution containing citrate complex ions was used for impregnation to allow said complex compound to be adsorbed on the surface of Vulcan. Then, the particles were heat-treated in a nitrogen atmosphere at 600° C. to provide carbon particles supporting fine perovskite type composite oxide $La(Fe_{0.97}Pt_{0103})O_3$ particles.

The $La(Fe_{0.97}Pt_{0.03})O_3$-supporting carbon particles thus obtained were observed by powder X-ray diffraction. A distinct single peak of the perovskite type structure was seen, as in Example 1, and its lattice constants were 5.5899×7.8246×5.5524 (A), indicating the relation 2b/(a+c)=1.404. Here, the average crystallite size determined from the half-width of the diffraction peak was 16.6 nm. In addition, TEM observations indicated that fine composite metal oxide particles of about 15 nm were scattered on the surface of the carbon particles.

Comparative Example 1

$La(Fe_{0.95}Pt_{0.05})O_3/C$, 40 wt % Supported Particles

The same procedure for producing fine particle-supporting carbon particles as in Example 1 except that particles were heat-treated in air at 250° C. for 1 hour before the heat treatment in nitrogen 600° C., and subsequently heat-treated in nitrogen at 600° C. was carried out to provide carbon particles supporting fine perovskite type composite oxide $La(Fe_{0.95}Pt_{0.05})O_3$ particles.

The $La(Fe_{0.95}Pt_{0.05})O_3$-supporting carbon particles thus obtained were observed by powder X-ray diffraction. A distinct single peak of the perovskite type structure was seen, as in Example 1, and its lattice constants were 5.6220×7.7639×5.5979 (Å), indicating the relation 2b/(a+c)=1.384. Here, the average crystallite size determined from the half-width of the diffraction peak was 7.5 nm. In addition, TEM observations indicated that fine composite metal oxide particles of about 5 to 10 nm were scattered on the surface of the carbon particles.

Comparative Example 2

La(Fe$_{0.99}$Pt$_{0.01}$)O$_3$/C, 40 wt % Supported Particles

The same procedure as in Example 1 except that 2.06 g, instead of 1.98 g, of iron nitrate nonahydrate and 0.03 g, instead of 0.14 g, of Hydrogen hexachloroplatinate hexahydrate were used was carried out to prepare an aqueous solution containing citrate complex ions of iron and platinum. A total 100 ml of the aqueous solution containing citrate complex ions was used for impregnation to allow said complex compound to be adsorbed on the surface of Vulcan. Then, the particles were heat-treated in a nitrogen atmosphere at 550° C. to provide carbon particles supporting fine perovskite type composite oxide La(Fe$_{0.99}$Pt$_{0.01}$)O$_3$ particles.

The La(Fe$_{0.99}$Pt$_{0.01}$)O$_3$-supporting carbon particles thus obtained were observed by powder X-ray diffraction. A distinct single peak of the perovskite type structure was seen, as in Example 1, and its lattice constants were 5.5852×7.8352×5.6069 (A), indicating the relation 2b/(a+c)=1.400. Here, the average crystallite size determined from the half-width of the diffraction peak was 18.2 nm. In addition, TEM observations indicated that fine composite metal oxide particles of about 20 nm were scattered on the surface of the carbon particles.

Comparative Example 3

La(Fe$_{0.98}$Pt$_{0.02}$)O$_3$/X, 40 wt % Supported Particles

The same procedure as in Example 1 except that 1.67 g, instead of 1.98 g, of iron nitrate nonahydrate and 0.56 g, instead of 0.14 g, of Hydrogen hexachloroplatinate hexahydrate were used was carried out to prepare an aqueous solution containing citrate complex ions of iron and platinum. A total 100 ml of the aqueous solution containing citrate complex ions was used for impregnation to allow said complex compound to be adsorbed on the surface of Vulcan. Then, the particles were heat-treated in air at 270° C. for 4 hours and further heat-treated in a nitrogen atmosphere at 600° C. to provide carbon particles supporting fine perovskite type composite oxide La(Fe$_{0.98}$Pt$_{0.02}$)O$_3$ particles.

The La(Fe$_{0.8}$Pt$_{0.2}$)O$_3$-supporting carbon particles thus obtained were observed by powder X-ray diffraction. A distinct single peak of the perovskite type structure was seen, as in Example 1, and its lattice constants were 5.5056×7.8846×5.5728 (A), indicating the relation 2b/(a+c)=1.423. Here, the average crystallite size determined from the half-width of the diffraction peak was 20.3 nm. In addition, TEM observations indicated that fine composite metal oxide particles of about 20 nm were scattered on the surface of the carbon particles.

Subsequently, membrane electrode assemblies (MEA) for fuel cells were produced and their output characteristics as fuel cells were determined to evaluate the catalyst characteristics of the fine particle-supporting carbon particles produced in the above examples and comparative examples. In a membrane electrode assembly (MEA) comprising electrodes of such fine particle-supporting carbon particles as produced above, the air electrode and the fuel electrode require different oxide contents in the fine particle-supporting carbon particles (the contents of the fine oxide particles supported on the carbon particles) to achieve maximum effects. In this example, therefore, an electrode membrane of fine particle-supporting carbon particles was used as the fuel electrode while a standard electrode membrane shown below was used as the air electrode to achieve impartial evaluation.

Example 5

Electrode Membrane of Fine Particle-Supporting Carbon Particles

One part by mass of the fine particle-supporting carbon particles produced in the aforementioned examples and comparative examples were added to 9.72 parts by mass of a Nation (trade name, EW=1000) solution supplied by Aldrich, which was a 5 mass % solution of polyperfluorosulfonic acid resin, 2.52 parts by mass of a Nation (trade name) solution supplied by Du Pont, which was a 20 mass % solution of polyperfluorosulfonic acid resin, and 1 part by mass of water, and a catalyst paint was prepared by stirring the liquid mixture sufficiently to achieve uniform dispersion. The aforementioned catalyst paint was applied over a PTFE film while adjusting the quantity of the supported platinum to 0.03 mg/cm$^2$, and then the paint was dried and peeled off to provide an electrode membrane of fine particle-supporting carbon particles.

Standard Electrode Membrane

As the standard electrode, 10E50E™, a platinum-supporting carbon product (which supports 50 mass % platinum) supplied by Tanaka Kikinzoku Kogyo, was used to prepare a catalyst paint by the same procedure as described above. The catalyst paint was applied over a PTFE film while adjusting the quantity of the supported platinum to 0.5 mg/cm$^2$, and then the paint was dried and peeled off to provide a standard electrode membrane.

Membrane Electrode Assembly

To provide a solid polymer electrolyte membrane, Nafion 112™, a polyperfluorosulfonic acid resin membrane product supplied by Du Pont, was cut into pieces of a predetermined size. The electrode membrane of fine particle-supporting carbon particles and the standard electrode membrane produced above were attached to either side of the solid polymer electrolyte membrane and they were adhered to each other using a hot press under the conditions of a temperature of 160° C. and a pressure of 4.4 MPa. Then, carbon nonwoven fabric (TgP-H-120 supplied by Toray Industries, Inc.) that had been subjected to water repellent finishing and the solid polymer electrolyte membrane having an electrode membrane on each side were adhered with a hot press to produce a membrane electrode assembly.

Cell Characteristics Evaluation

The membrane electrode assembly produced above was used to perform cyclic voltammetry (CV) to provide CV curves, and measure the output characteristics (specifically, maximum output density) expected from a fuel cell comprising the assembly. For the output characteristics measurement, the measuring system including the membrane electrode assembly was maintained at 60° C., and hydrogen gas humidified and heated to adjust the dew point to 60° C. is supplied to the fuel electrode while air humidified and heated to adjust the dew point to 60° C. is supplied to the air electrode.

Of the results obtained, CV measurements taken for the particles produced in Example 1 are shown in FIG. 3 where an iron redox peak is clearly seen on the CV curve. CV measurements taken for the particles produced in Comparative example 1 are shown in FIG. 4 where the iron redox peak is weak, indicating that the catalytic ability is low.

Table 1 summarizes measurements for the fine particle-supporting carbon particles produced in Examples 1 to 4 and Comparative examples 1 to 3 described above, and measurements for the membrane electrode assemblies produced from these fine particle-supporting carbon particles in Example 5. Here, the CV measurements are evaluated in terms of the relative feature of the peaks attributable to iron atoms, and shown by ○ for a discrete peak as in FIG. 3, x for a very broad peak as in FIG. 4, and Δ for an intermediate peak.

The diagram given in FIG. 5 illustrates the relations among the lattice constants a, b, and c of the perovskite type structure in the perovskite type oxides produced in Examples and Comparative examples. The vertical axis represents the length of the b-axis, which is the major axis, while the horizontal axis represents the average of the a- and c-axis lengths, and the gray area shows the region defined by the following equation (1):

$$1.402 < 2b/(a+c) < 1.422 \quad (1)$$

TABLE 1

<Fine particle-supporting carbon particles>

| | Composition | XRD observation | $2b/(a+c)$ | CV curve (Fe peak) | Maximum output density, mW/cm$^2$ |
|---|---|---|---|---|---|
| Example 1 | La (Fe$_{0.95}$Pt$_{0.05}$)O$_3$/C | perovskite type | 1.416 | ○ | 178 |
| Example 2 | La (Fe$_{0.95}$Pt$_{0.05}$)O$_3$/C | perovskite type | 1.410 | ○ | 171 |
| Example 3 | La (Fe$_{0.98}$Pt$_{0.02}$)O$_3$/C | perovskite type | 1.414 | ○ | 165 |
| Example 4 | La (Fe$_{0.97}$Pt$_{0.03}$)O$_3$/C | perovskite type | 1.404 | ○ | 152 |
| Comparative example 1 | La (Fe$_{0.95}$Pt$_{0.05}$)O$_3$/C | perovskite type | 1.384 | x | ~0 |
| Comparative example 2 | La (Fe$_{0.99}$Pt$_{0.01}$)O$_3$/C | perovskite type | 1.400 | x | ~0 |
| Comparative example 3 | La (Fe$_{0.8}$Pt$_{0.2}$)O$_3$/C | perovskite type | 1.423 | Δ | <10 |

As seen from Table 1 and FIG. 5, all fine particle-supporting carbon particles produced in Examples, which have lattice constants in a specific range, give a CV curve that contains a redox peak attributable to iron toms, indicating that the iron toms contained have redox activity and can serve effectively as cathode catalyst for fuel cells. For the particles produced in Comparative examples, on the other hand, the lattice constants are out of the specific range, and the transition metal elements contained have only low-level redox activity, indicating that they will not serve effectively as cathode catalyst for fuel cells, although they are similar in composition and structure to the particles produced in Examples.

The invention claimed is:

1. Fine transition metal oxide particles comprising, as main phase, a perovskite type structure as represented by the general formula ABO$_3$,
(where "A" denotes one or more elements selected from the group of lanthanum, strontium, cerium, calcium, yttrium, erbium, praseodymium, neodymium, samarium, europium, silicon, magnesium, barium, niobium, lead, bismuth, and antimony, "B" denotes one or more elements selected from the group of iron, cobalt, manganese, copper, titanium, chrome, nickel, and molybdenum) wherein the lattice constants of said fine oxide particles meet the following conditional equation (1):

$$1.402 < 2b/(a+c) < 1.422 \quad (1)$$

(where, "a" and "c" denote the minor-axis lengths of the perovskite type crystal while "b" denotes its major-axis length), and wherein said fine oxide particles contain a noble metal.

2. Fine perovskite type oxide particles as claimed in claim 1 comprising mainly iron as the element denoted by "B" (B-element).

3. Fine perovskite type oxide particles as claimed in claim 1 wherein the average particle diameter is 1 to 20 nm.

4. Fine perovskite type oxide particles as claimed in claim 1 wherein said noble metal is in the form of noble metal atoms substituted for part of the atoms constituting the oxide crystal lattice, or in the form of noble metal crystals combined with oxide crystals to form composite structures, or in the form of noble metal particles adhered to the oxide surface.

5. Fine perovskite type oxide particles as claimed in claim 1 wherein the element ratio of said noble metal to the total quantity of said B-element is in the range of 1 to 20%.

6. Perovskite type oxide-supporting particles comprising fine perovskite type oxide particles as claimed in any one of claims 1, 2, 3, 4 and 5 supported on an electrically conductive carrier.

7. Perovskite type oxide-supporting particles as claimed in claim 6 wherein said electrically conductive carrier is electrically conductive carbon particles.

8. Perovskite type oxide-supporting particles as claimed in claim 6 wherein the ratio by weight of the supported fine perovskite type oxide particles in the perovskite type oxide-supporting particles ([weight of fine perovskite type oxide particles]/[total weight of oxide-supporting particles]) is in the range of 5 to 50 wt %.

9. A catalyst material comprising, as a primary component, fine perovskite type oxide particles as claimed in any one of claims 1, 2, 3, 4 and 5.

10. A catalyst material for oxygen reduction comprising, as a primary component, fine perovskite type oxide particles as claimed in any one of claims 1, 2, 3, 4 and 5.

11. A catalyst material for fuel cells that uses the oxygen reduction action of the catalyst material for oxygen reduction claimed in claim 10.

12. An electrode for fuel cells comprising a catalyst material for fuel cells as claimed in claim 11.

* * * * *